United States Patent [19]

Inagaki et al.

[11] Patent Number: 4,939,404
[45] Date of Patent: Jul. 3, 1990

[54] VIBRATION WAVE MOTOR

[75] Inventors: Akio Inagaki, Okazaki; Kiyotaka Nakai, Chita; Hitoshi Tauchi, Toyota, all of Japan

[73] Assignee: Aisin Seiki Kabushiki Kaisha, Kariya, Japan

[21] Appl. No.: 341,820

[22] Filed: Apr. 24, 1989

[30] Foreign Application Priority Data

Apr. 22, 1988 [JP] Japan .................. 63-100694

[51] Int. Cl.⁵ .......................................... H01L 41/08
[52] U.S. Cl. .................................................. 310/323
[58] Field of Search ................................ 310/323, 328

[56] References Cited

U.S. PATENT DOCUMENTS

| | | | |
|---|---|---|---|
| 4,400,641 | 8/1983 | Vishnevsky et al. | 310/323 |
| 4,453,103 | 6/1984 | Vishnevsky et al. | 310/323 |
| 4,736,129 | 4/1988 | Endo et al. | 310/323 |

FOREIGN PATENT DOCUMENTS

| | | | |
|---|---|---|---|
| 0209865 | 1/1987 | European Pat. Off. | 310/323 |
| 0222394 | 5/1987 | European Pat. Off. | 310/323 |
| 0022479 | 2/1985 | Japan | 310/323 |
| 0023379 | 1/1987 | Japan | 310/323 |
| 0058887 | 3/1987 | Japan | 310/323 |
| 0114480 | 5/1987 | Japan | 310/323 |
| 0147978 | 7/1987 | Japan | 310/323 |
| 62-147979 | 7/1987 | Japan | 310/323 |

*Primary Examiner*—Mark O. Budd
*Attorney, Agent, or Firm*—Burns, Doane, Swecker & Mathis

[57] ABSTRACT

A vibration wave motor includes a stator with an upper surface at which is generated a travelling vibration, a rotor with a lower surface rotatably mounted on the upper surface of the stator, and an urging device for developing a frictional force between the upper surface of the stator and the lower surface of the rotor. A sheet member is attached to either the upper surface of the stator or the lower surface of the rotor and the sheet member includes a base member having ultra heat-resistant properties, a fluorine-contained resin and a filler in the form of fibers.

6 Claims, 2 Drawing Sheets

| | | COMPOSITION | | | TEST RESULTS | | | | | EVALUATION |
|---|---|---|---|---|---|---|---|---|---|---|
| | | BASE MEMBER (WT. %) | ADDING RESIN (WT. %) | FILLER (WT. %) | STARTING TORQUE (KG-CM) | NON-LOAD ROTATING NS. (RPM) | EFFICIENCY (%) | WEAR OF SHEET (μ) | WEAR OF STATOR (μ) | |
| EMBODIMENTS | 1 | PEEK 100 PARTS | FLUORINE-CONTAINED RESIN 40 PARTS | AROMATIC POLYAMID FIBER 10 PARTS | 10.9 | 180 | 39 | 3.8 | 0.2 | ○ |
| | 2 | PEEK 100 PARTS | FLUORINE-CONTAINED RESIN 10 PARTS | AROMATIC POLYAMID FIBER 5 PARTS | 10.2 | 155 | 36 | 7.4 | 0.3 | ○ |
| | 3 | PEEK 100 PARTS | FLUORINE-CONTAINED RESIN 40 PARTS | AROMATIC POLYAMID FIBER 5 PARTS | 10.6 | 168 | 36 | 2.9 | 0.2 | ○ |
| | 4 | POLYETHER-SALPHON RESIN 100 PARTS | FLUORINE-CONTAINED RESIN 40 PARTS | AROMATIC POLYAMID FIBER 10 PARTS | 9.8 | 149 | 34 | 6.6 | 0.1 | ○ |
| | 5 | POLYETHER-SALPHON RESIN 100 PARTS | FLUORINE-CONTAINED RESIN 40 PARTS | POTASSIUM TITANE FIBER 10 PARTS | 10.3 | 152 | 37 | 5.8 | 0.4 | ○ |
| COMPARATIVE EXAMPLES | 1 | PEEK 100 PARTS | FLUORINE-CONTAINED RESIN 80 PARTS | AROMATIC POLYAMID FIBER 10 PARTS | 6.4 | 108 | 26 | 4.0 | 0.1 | × |
| | 2 | PEEK 100 PARTS | FLUORINE-CONTAINED RESIN 5 PARTS | AROMATIC POLYAMID FIBER 10 PARTS | 11.2 | 163 | 37 | 12.4 | 0.7 | × |
| | 3 | BT RESIN 100 PARTS | NOT CONTAINED | AROMATIC POLYAMID FIBER 50 PARTS | 9.2 | 140 | 31 | 33.6 | 0.9 | × |
| | 4 | POLYMIDE 100 PARTS | NOT CONTAINED | SILICA POWDER 10 PARTS | 10.8 | 160 | 33 | 21.4 | 102.6 | × |

Fig. 3

| | | COMPOSITION | | | TEST RESULTS | | | | | EVALUATION |
|---|---|---|---|---|---|---|---|---|---|---|
| | | BASE MEMBER (WT. %) | ADDING RESIN (WT. %) | FILLER (WT. %) | STARTING TORQUE (KG-CM) | NON-LOAD ROTATING NS. (RPM) | EFFICIENCY (%) | WEAR OF SHEET (μ) | WEAR OF STATOR (μ) | |
| EMBODIMENTS | 1 | PEEK 100 PARTS | FLUORINE-CONTAINED RESIN 40 PARTS | AROMATIC POLYAMID FIBER 10 PARTS | 10.9 | 180 | 39 | 3.8 | 0.2 | ○ |
| | 2 | PEEK 100 PARTS | FLUORINE-CONTAINED RESIN 10 PARTS | AROMATIC POLYAMID FIBER 5 PARTS | 10.2 | 155 | 36 | 7.4 | 0.3 | ○ |
| | 3 | PEEK 100 PARTS | FLUORINE-CONTAINED RESIN 40 PARTS | AROMATIC POLYAMID FIBER 5 PARTS | 10.6 | 168 | 36 | 2.9 | 0.2 | ○ |
| | 4 | POLYETHER-SALPHON RESIN 100 PARTS | FLUORINE-CONTAINED RESIN 40 PARTS | AROMATIC POLYAMID FIBER 10 PARTS | 9.8 | 149 | 34 | 6.6 | 0.1 | ○ |
| | 5 | POLYETHER-SALPHON RESIN 100 PARTS | FLUORINE-CONTAINED RESIN 40 PARTS | POTASSIUM TITANE FIBER 10 PARTS | 10.3 | 152 | 37 | 5.8 | 0.4 | ○ |
| COMPARATIVE EXAMPLES | 1 | PEEK 100 PARTS | FLUORINE-CONTAINED RESIN 80 PARTS | AROMATIC POLYAMID FIBER 10 PARTS | 6.4 | 108 | 26 | 4.0 | 0.1 | × |
| | 2 | PEEK 100 PARTS | FLUORINE-CONTAINED RESIN 5 PARTS | AROMATIC POLYAMID FIBER 10 PARTS | 11.2 | 163 | 37 | 12.4 | 0.7 | × |
| | 3 | BT RESIN 100 PARTS | NOT CONTAINED | AROMATIC POLYAMID FIBER 50 PARTS | 9.2 | 140 | 31 | 33.6 | 0.9 | × |
| | 4 | POLYMIDE 100 PARTS | NOT CONTAINED | SILICA POWDER 10 PARTS | 10.8 | 160 | 33 | 21.4 | 102.6 | × |

VIBRATION WAVE MOTOR

BACKGROUND OF THE INVENTION

1. Field of the Invention

The present invention relates to a vibration wave motor driven by a travelling vibration.

2. Description of Related Art

In general, a vibration wave motor includes a stator at which is generated a travelling vibration and a rotor which is rotatably mounted on the stator for rotation by the travelling vibration. A sheet member is disposed between the stator and the rotor for facilitating smooth rotation of the rotor without noise.

However, some conventional sheet members are not sufficiently durable against friction and some conventional sheet members cause damage to the surface of the rotor or the stator.

SUMMARY OF THE INVENTION

It is, therefore, a principal object of the present invention to provide a vibration wave motor having a sheet member that overcomes the aforementioned drawbacks.

Another object of the present invention is to provide a vibration wave motor having a sheet member which possesses good durability against friction and which also, will not damage the sliding surface of a stator or a rotor.

According to the present invention, a vibration wave motor includes a stator having an upper surface at which a travelling vibration is generated, a rotor with a lower surface that is rotatably mounted on the upper surface of the stator, means for applying frictional force between the upper surface of the stator and the lower surface of the rotor and a sheet member secured to one of either of the upper surface of the stator and the lower surface of the rotor, wherein the sheet member includes a base member having ultra heat-resistant properties, a fluorine-contained resin and a filler in the form of fibers.

BRIEF DESCRIPTION OF THE DRAWINGS

The above and other objects, features and advantages of the present invention will become apparent and more readily appreciated from the following detailed description of the preferred exemplary embodiment of the invention, taken in connection with the accompanying drawing, in which:

FIG. 3 is a table showing test results of other embodiments of the present invention versus selected comparative examples.

DETAILED DESCRIPTION OF THE PREFERRED EMBODIMENTS

Figure 1:
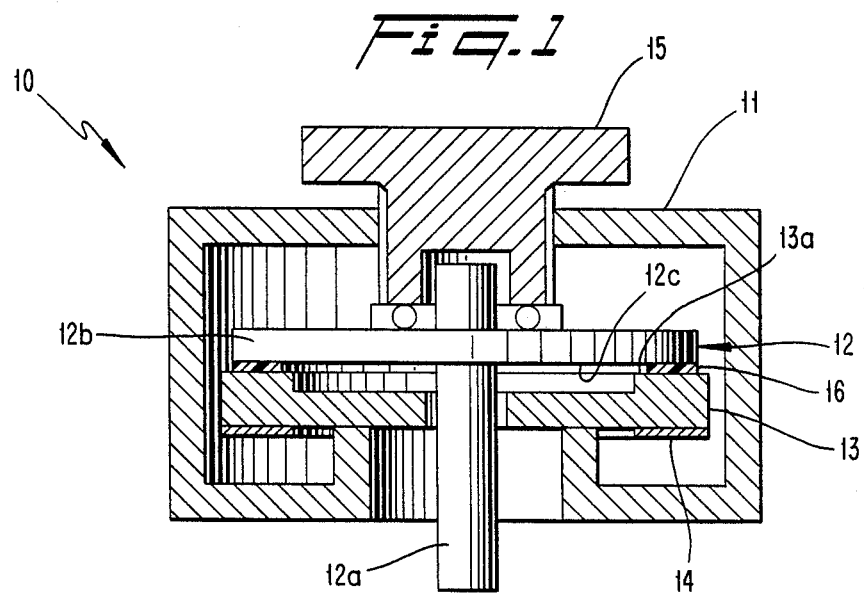
FIG. 1 is a cross-sectional view of a vibration wave motor according to one embodiment of the present invention.
Figure 2:
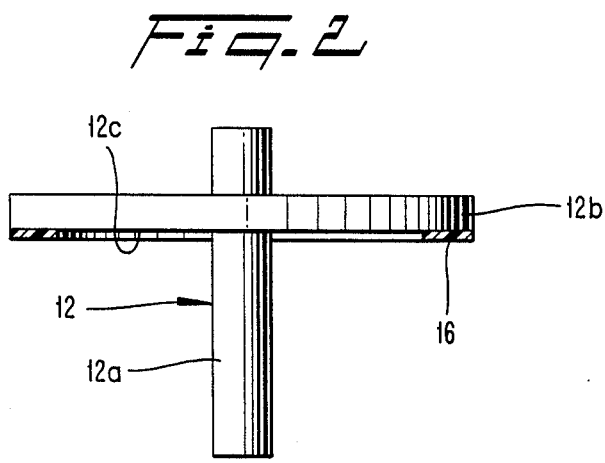
FIG. 2 is a side view of the rotor positioned in the vibration wave motor depicted in FIG. 1.

Referring now to FIGS. 1 and 2, a vibration wave motor 10 includes a casing 11 in which is positioned a rotor 12 having a shaft 12a and an annular portion 12b in the form of a circular plate. The annular portion 12b of the rotor 12 is rotatably mounted on a stator 13 that is connected with a piezoelectric member 14. Upon energization of the piezoelectric member 14, a travelling wave or a travelling vibration is generated in the stator 13, and as a result, the annular portion 12b of the rotor 12 rotates about the shaft 12a. An urging member 15 tends to urge the rotor 12 towards the stator 13 so that a frictional force is developed between the rotor 12 and the stator 13. A sheet member 16 is secured to the lower surface 12c of the rotor 12 in order to prevent frictional wear between the lower surface 12c of the rotor 12 and the upper surface 13a of the stator 13 without decreasing the frictional force therebetween. Several sheet members with different composition are useful for performing that function.

For producing a first embodiment of the sheet member 16, fluorine-contained resin (supplied by Asani Glass Co., Ltd.) of 40 wt. % as an adding resin and aromatic polyamide fiber (supplied by DuPont as KEVLAR) which is in the form of 1 mm pulp of 10 wt. % as a filler are mixed into polyester-ether-ketone resin or PEEK resin (supplied by Sumitomo Chemical Co., Ltd. as 450G) of 100 wt. % as a base resin or a base member, thereby resulting in an amount of the mixture. This mixture is then formed into a flat plate through an injection process and the resulting plate 16 is secured to the lower surface 12c of the rotor 12 by using a bonding agent of the epoxy family (supplied by Ciba-Geigy as XD-911). After the plate 16 is secured to the lower surface 12c of the rotor 12, the portion of the sheet member 16 extending outwardly beyond the edge of the annular portion 12b is cut-off or otherwise removed so that the outer periphery of the sheet member 16 coincides with the outer periphery of the annular portion 12b.

After the vibration wave motor is assembled, the starting-torque, the number of rotations of the rotor 12 without load and the efficiency defined by the ratio of the mechanical output to the voltage applied to the piezoelectric member 14 are measured. Further, after 1000 operations of the motor 10, in which each operation consists of driving the motor 10 for one minute under a load of 4 kgf.cm and at an apparent rotation of 100 rpm and ceasing operation of the motor for three minutes, the amount of wear of the upper surface 13a of the stator 13 and the sheet member 16 are measured by using an instrument. The results of those measurements are illustrated in the annexed table.

In addition to the first embodiment as mentioned above, an additional four embodiments and four comparative examples are illustrated in FIG. 3.

As is apparent from the table shown in FIG. 3, the following results can be achieved through the arrangement according to the present invention.

(1) The addition of fiber in the sheet member, which is in sliding engagement with the upper surface of the stator, increases the frictional force between the upper surface of the stator and the lower surface of the rotor, thereby increasing the starting torque.

(2) The use of resin with ultra heat-resistant properties as a base member results in the prolongation of the life of the motor.

(3) Through the addition of fluorine-contained resin in the sheet member, the sheet members's durability against friction can be increased.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. A vibration wave motor comprising:

A vibration wave motor comprising:

a stator having an upper surface at which is generated a travelling vibration;

a rotor having a lower surface that is rotatably mounted on the upper surface of the stator;

urging means for applying a frictional force between the upper surface of the stator and the lower surface of the rotor; and a sheet member secured to one of either of the upper surface of the stator and the lower surface of the rotor, said sheet member including means for increasing the durability of the sheet member against friction, a filler in the form of fibers, and a base member having ultra heat-resistant properties, said means for increasing the durability of the sheet member against friction including a fluorine-containing resin.

2. A vibration wave motor according to claim 1, wherein the base member is a polyester-ether-ketone resin.

3. A vibration wave motor according to claim 1, wherein the base member is a polyester-ether-salphone resin.

4. A vibration wave motor according to claim 1, wherein the amount of the fluorine-contained resin ranges from 10 parts by weight percent, inclusive, to 80 parts by weight percent, not inclusive, with respect to the base member of 100 parts by weight percent.

5. A vibration wave motor according to claim 1, wherein the filler is an aromatic polyamide fiber.

6. A vibration wave motor according to claim 1, wherein the filler is a potassium titanate fiber.

* * * * *